United States Patent [19]
Thurston

[11] 3,841,371
[45] Oct. 15, 1974

[54] LOCK NUT

[75] Inventor: Raymond L. Thurston, Flossmoor, Ill.

[73] Assignee: Microdot Inc., New York, N.Y.

[22] Filed: May 8, 1970

[21] Appl. No.: 35,735

Related U.S. Application Data

[63] Continuation-in-part of Ser. No. 748,859, July 30, 1968, abandoned.

[52] U.S. Cl. .............................. 151/21 R, 85/32 V
[51] Int. Cl. ..................... F16b 29/00, F16b 39/284
[58] Field of Search: ....... 151/21 A, 21 B, 21 C, 22, 151/14, 41.73, 15; 85/32 V; 10/86 A, 86 R, 155

[56] References Cited
UNITED STATES PATENTS

| | | | |
|---|---|---|---|
| 337,801 | 3/1886 | Vaughn | 151/21 A |
| 932,572 | 8/1909 | Poffinbarger | 85/32 V X |
| 1,029,846 | 6/1912 | Bullard | 151/21 A |
| 2,896,495 | 7/1959 | Crawford | 85/32 V |
| 3,081,808 | 3/1963 | Rosan et al. | 151/41.73 |
| 3,198,230 | 8/1965 | Stover | 151/21 B |

FOREIGN PATENTS OR APPLICATIONS

| | | | |
|---|---|---|---|
| 499,834 | 1/1939 | Great Britain | 85/32 V |
| 895,237 | 5/1962 | Great Britain | 151/21 B |

Primary Examiner—Ramon S. Britts
Attorney, Agent, or Firm—Harness, Dickey & Pierce

[57] ABSTRACT

A lock nut comprising, a body having a central cylindrically shaped opening extending axially therethrough, the opening having three equally circumferentially spaced radially outwardly extending arcuate relief grooves formed in the periphery thereof and extending axially the entire length thereof, the relief grooves defining three equally circumferentially spaced axially extending outwardly deflectable land sections therebetween. The relief grooves and the land sections are of equal circumferential dimension, and the land sections are provided with a standard thread form having a common lead, pitch, sense and configuration, with the grooves extending radially outwardly to at least the root depth of the thread form, whereby the radially outermost portion of each of the relief grooves is disposed no closer to the center of the opening than tangent to the root depth of the nut. The thread form has a pitch diameter less than the pitch diameter of the thread of the associated fastening element, whereby upon threaded engagement of the nut body with the fastening element, each of the land sections will deflect or expand radially outwardly as a beam until the thread form of the nut has a pitch diameter equal to and coinciding with the pitch diameter of the fastening element.

1 Claim, 4 Drawing Figures

PATENTED OCT 15 1974

3,841,371

INVENTOR.
Raymond L. Thurston
BY
Harness, Dickey & Pierce
ATTORNEYS.

LOCK NUT

RELATED APPLICATIONS

This application is a continuation-in-part of U.S. Pat. application, Ser. No. 748,859, Filed July 30, 1968, for Lock Nut, now abandoned.

SUMMARY OF THE INVENTION

This invention relates generally to the lock nut art and, more particularly, to a new and improved lock nut which is characterized by superior holding qualities and low manufacturing expenses.

It is accordingly a general object of the present invention to provide a new and improved lock nut construction.

It is a more particular object of the present invention to provide a new and improved lock nut having a plurality of radially outwardly extending grooves formed around the periphery of the central opening thereof, which grooves define a plurality of relatively flexible or deflectable land sections which are provided with a standard thread form of a pitch diameter that is predeterminately less than the pitch diameter of the threaded elements with which the lock nut is to be associated. The land sections are outwardly deflectable or expandable upon threaded reception of the lock nut on the fastening element in a manner such that the pitch diameter of the thread form will enlarge to coincide with the pitch diameter on the fastening element.

It is a related object of the present invention to provide a new and improved lock nut of the above character which is characterized by superior holding characteristics by virtue of the deflectable land sections which, upon deflecting outwardly, as above described, assure substantial surface-to-surface contact between the thread form on the lock nut and the threads of the associated fastening element.

It is a further object of the present invention to provide a new and improved lock nut of the above described type which may be fabricated with standard nut producing equipment and therefore will be no more expensive to manufacture than standard nuts.

Other objects and advantages of the present invention will become apparent from the following detailed description taken in conjunction with the accompanying drawing.

DETAILED DESCRIPTION OF THE PREFERRED EMBODIMENT

Figure 1:
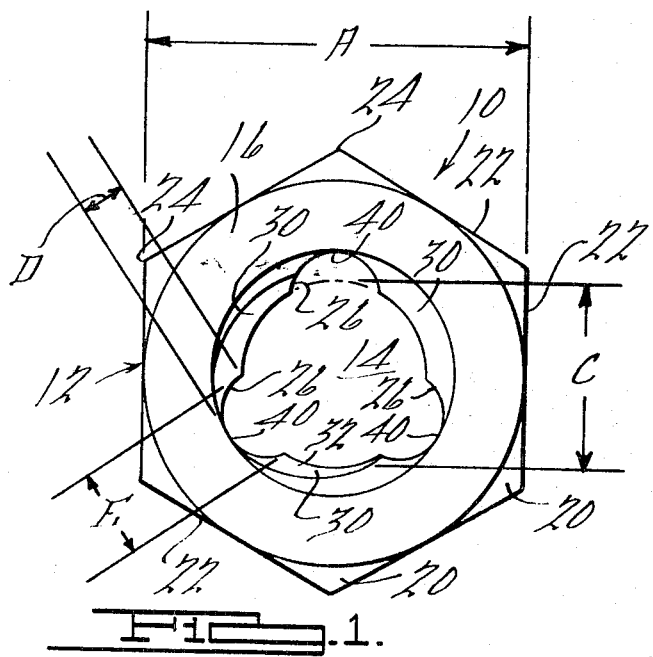
FIG. 1 is a plan view of a lock nut embodying features of the present invention.
Figure 2:
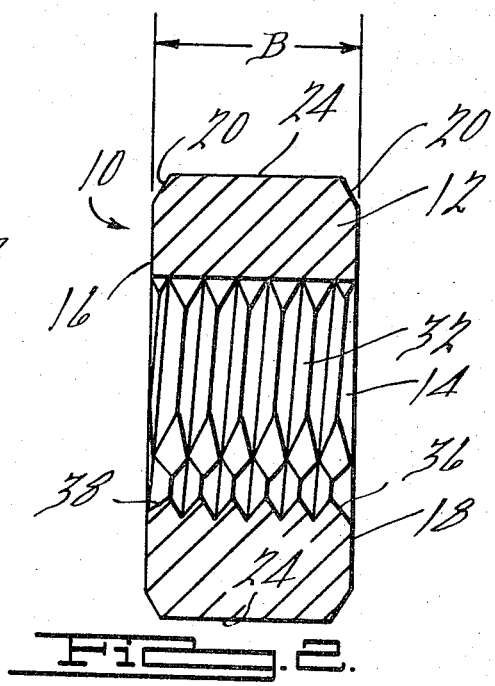
FIG. 2 is a transverse cross-sectional view of the lock nut illustrated in FIG. 1, as taken substantially along the line 2—2 thereof.
Figure 3:
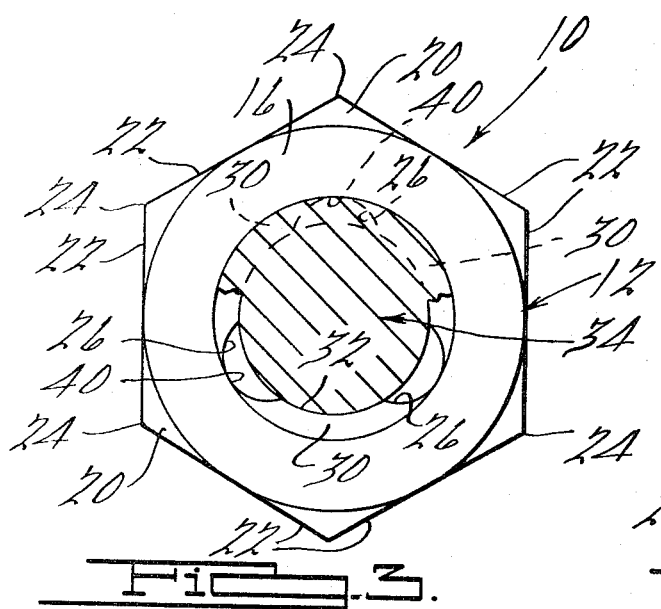
FIG. 3 is a plan view of the lock nut illustrated in FIG. 1, as shown when threaded onto a typical screw, bolt or similar fastening element.

Referring now in detail to the drawing and in particular to FIGS. 1 - 3, a lock nut 10, in accordance with an exemplary embodiment of the present invention, is shown as comprising a body 12 that is adapted to be fabricated in a conventional manner from a relatively short length of wire or rod stock that is formed in a suitable die, by way of example, to the generally hexagonal configuration shown herein. As a result of the forming operation, the lock nut 10 is formed or stamped with a central annular opening 14 and with a pair of opposed washer engaging, spaced parallel faces 16 and 18 which have the outer marginal edges thereof chamfered inwardly in a conventional manner, as seen at 20. The lock nut 10 is formed with six equal axially disposed sides or faces, generally designated 22, which are adapted for engagement by a suitable wrench or the like and define equally circumferentially spaced marginal corners 24 therebetween.

In accordance with the principles of the present invention, during the course of the aforementioned forming or stamping operation in which the central opening 14 is provided in the body 12, a plurality of radially outwardly directed, axially extending identical arcuate grooves or recesses, generally designated 26, are formed around the inner periphery of the opening 14. In a preferred embodiment of the present invention, three equally circumferentially spaced relief grooves 26 are formed around the periphery of the opening 14. The plurality of relief grooves 26 define therebetween an equal number of lobe or land sections, generally designated 30, that have the radially inner marginal portions thereof provided with a thread form 32 by means of a conventional thread tapping operation as is well known in the art, whereby to adapt the lock nut 10 for threaded engagement with an externally threaded fastening element, screw, bolt or the like, representatively illustrated in FIG. 3 and designated by the numeral 34. It may be noted that the thread form 32 is provided on the entire surfaces of the land sections 30 confronting the opening 14 and that the threads constituting the thread form 32 are continuous and have a pitch, sense and configuration in common with each other and with said fastening element.

The size of the tapping or other thread forming tool used in the formation of the thread form 32 is selected so as to be predeterminately undersize, as will be described, with respect to the associated fastening element 34, with the result that the pitch diameter of the thread form 32 is predeterminately smaller than the pitch diameter of the threads provided on the element 34.

The body 12 of the lock nut 10 is so rotatably located or oriented with respect to the groove forming tool or punch such that when the grooves 26 are formed, they are arranged in radial alignment with alternate corners 24 of the nut 10. The purpose of this arrangement is to provide the maximum cross-sectional area, i.e., maximum amount of metal stock, between the radially outermost portions of the grooves 26 and the outer periphery of the portion of the body 12 radially aligned therewith, so as to maximize the wrenching strength of the nut 10. The portions of the nut 10 extending between the grooves 26 are deflectable outwardly in much the same manner as a beam, whereby the nut body 12 may expand radially outwardly so that the pitch diameter of the thread form 32 will enlarge to become equal to the pitch diameter of the threads on the associated fastening element 34. The axially opposite ends of the central opening 14 are preferably chamfered at approximately 45°, as seen at 36 and 38 in FIG. 2, to provide a pair of lead or pilot areas adapted for reception of the end of the fastening element 34 onto which the nut 10 is to be threaded, and to facilitate initial threaded engagement therebetween.

In accordance with a preferred embodiment of the present invention, the plurality of grooves 26 are semi-circular in cross-sectional shape and are defined by generally arcuate concave faces 40. The grooves 26 are of uniform radial depth and are designed such that the radially outermost portions thereof are substantially tangent to the root diameter of the thread form 32, with the result that the root length of the thread form 32 on the land sections 30 is approximately twice the crown length of said thread form, so as to maximize the shear strength of the lock nut 10 of the present invention.

Additionally, the above described relationship results in a substantial area of engagement between the thread form 32 and the threads on the associated fastening element 34, which in turn results in uniform inward pressure being exerted against the threads of the fastening element by the nut 10, as will hereinafter be described.

Figure 4:
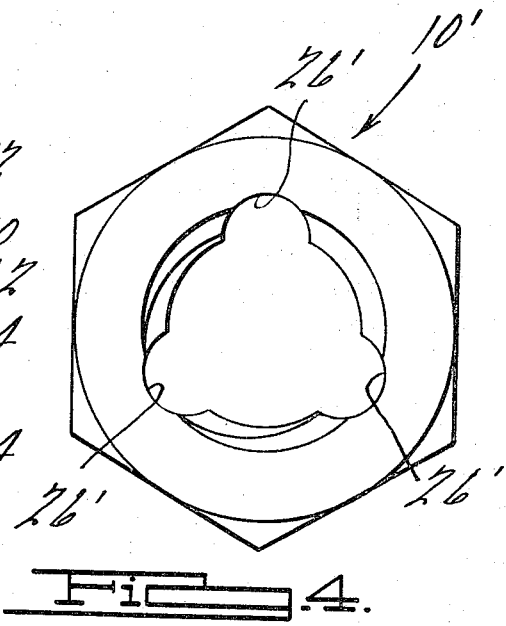
FIG. 4 is a plan view of a lock nut in accordance with a modified embodiment of the present invention.

It may be noted that while in a preferred embodiment of the present invention, the arcuate faces 40 defined by the grooves 26 are substantially tangent to the thread root diameter, for certain size lock nuts and for certain types of threads, it may be advantageous to have the grooves 26 extend slightly radially outwardly beyond the root diameter of the thread form, as is indicated by the grooves 26' that are formed in the lock nut 10' illustrated in FIG. 4; however, it is highly preferred that the radially outermost portions of the grooves 26 or 26' are never located any closer to the center of the nut 10 than tangent to the root diameter of the thread form 32.

The lock nut 10 of the present invention is intended to be fabricated from the same materials as conventional nuts which are by convention softer, i.e., have lower Brinnel hardness ratings, than the stock from which the associated fastening elements are fabricated. Additionally, the lock nut 10 is adapted to be manufactured in several sizes and/or grades, as provided by SAE standards. Toward this end, reference may be made to FIGS. 1 and 2 and to the following chart wherein the preferred dimensions are presented for various size lock nuts constructed in accordance with the present invention and adapted to be operatively associated with certain SAE standard thread sizes.

thread form 32 progressively threadably engages the threads on the element 34. As the nut 10 is screwed upon the element 34, the nut body 12 will expand radially outwardly by virtue of the threaded land sections 30 bending as a beam, which results in the pitch diameter of the thread form 32 enlarging to a diameter equal to and coinciding with the pitch diameter of threads on the fastening elements 34. The internal forces resulting from such expansion of the lock nut 10 will result in the threaded land sections 30 exerting uniform radially inwardly directed pressures against the periphery of the fastening element 34 along the entire circumferential length of each of the sections 30. This, in turn, results in virtually complete surface-to-surface contact between the thread form 32 and the threads on the fastening element engaged therewith, thus creating substantial frictional forces between the nut 10 and the fastening element 34 which effectively resist relative rotation therebetween so as to prevent loosening or backing up of the lock nut 10 on the element 34 in service.

It will be seen from the foregoing description that the present invention provides a new and improved lock nut construction which will be found to be far superior in both shear strength and resistance to loosening or backing up as compared to standard nut designs. The superior locking capability of the nut of the present invention is attributed to the provision and particular arrangement of the radially outwardly deflectable or expandable threaded land sections which are defined by the peripheral relief grooves in the central opening of the nut, which land sections, by virtue of their flexible or deflectable character, exert uniform inwardly directed pressure against the periphery of the associated fastening element that results in substantial surface-to-surface contact between the thread form on the nut and the threads of the associated element. Accordingly, the present invention provides a lock nut that may be manufactured at no greater expense than standard nuts, yet has superior locking or holding ability as compared to such standard nut designs.

While it will be apparent that the preferred embodiments illustrated herein are well calculated to fulfill the objects above stated, it will be appreciated that the present invention is susceptible to modification, variation and change without departing from the scope of the following claim.

| Thread Size | A Max. | A Min. | B Max. | B Min. | C Hole Size Max. | C Hole Size Min. | D Relief Depth | E Relief Width |
|---|---|---|---|---|---|---|---|---|
| 1/4–20 | .438 | .428 | .220 | .212 | .192 | .187 | .0433 | .108 |
| 1/4–28 | .438 | .428 | .220 | .212 | .200 | .195 | .031 | .113 |
| 5/16–18 | .500 | .489 | .273 | .258 | .240 | .240 | .048 | .138 |
| 5/16–24 | .500 | .489 | .273 | .258 | .250 | .245 | .036 | .143 |
| 3/8–16 | .583 | .551 | .337 | .320 | .295 | .288 | .054 | .167 |
| 3/8–24 | .563 | .551 | .337 | .320 | .302 | .297 | .036 | .174 |
| 7/16–14 | .688 | .675 | .385 | .365 | | | | |
| 7/16–20 | .688 | .675 | .385 | .365 | | | | |
| 1/2–13 | .750 | .738 | .448 | .427 | | | | |
| 1/2–20 | .750 | .738 | .448 | .427 | | | | |

In operation of the lock nut 10 of the present invention, the nut body 12 is initially coaxially oriented with respect to the threaded end of the associated fastening element 34, with the end of the element 34 being nestingly received within one of the chamfered areas 36 or 38. The nut 10 is then rotated or screwed relative to the fastening element 34 (or vice versa), whereupon the

I claim:

1. In a lock nut in combination with an externally threaded element of predetermined thread profile, pitch, pitch diameter and hardness, the improvement comprising
a body portion of a material relatively softer than the material of said threaded element so as to preclude cutting of said threaded element by said lock nut, said body portion having a central axis and a circular cylindrical opening extending therethrough coaxially with said central axis, the opening in said body portion having three equally circumferentially spaced, radially outwardly extending relief grooves on the periphery thereof, the relief grooves in said body portion extending axially the entire length of said opening and being of like arcuate configuration and radial spacing from the central axis of said body portion, said relief grooves defining three equally circumferentially spaced axially extending land sections therebetween respectively, said relief grooves and said land sections being of substantially equal circumferential dimension, said land sections being provided with a thread form having a pitch, sense and profile similar to said threaded element, the relief grooves in said body portion extending radially outwardly to at least the root depth of the thread profile on said land sections, the thread form on the lands of said nut, respectively, having a pitch diameter relatively less than the pitch diameter of the threads on said threaded element, whereby the lands on the body portion of said nut are elastically deflected radially outwardly upon engagement with said element to provide substantial surface-to-surface contact between the threads of said nut and the threads of said element as well as balanced pressure on each of said lands.

* * * * *